(12) United States Patent
Kita et al.

(10) Patent No.: US 7,217,902 B2
(45) Date of Patent: May 15, 2007

(54) WIRE-CUT ELECTRIC DISCHARGE MACHINE

(75) Inventors: Yuki Kita, Yamanashi (JP); Yushi Takayama, Yamanashi (JP); Yoshinori Makino, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/237,714

(22) Filed: Sep. 29, 2005

(65) Prior Publication Data
US 2006/0065637 A1    Mar. 30, 2006

(30) Foreign Application Priority Data
Sep. 29, 2004   (JP)  ............... 2004-285142

(51) Int. Cl.
*B23H 7/10*   (2006.01)
(52) U.S. Cl. .................................. 219/69.12
(58) Field of Classification Search .............. 219/69.12
See application file for complete search history.

(56) References Cited

U.S. PATENT DOCUMENTS

| 4,645,894 | A | * | 2/1987 | Bonga ...................... 219/69.12 |
| 4,803,327 | A | * | 2/1989 | Obara ...................... 219/69.12 |
| 5,268,552 | A | * | 12/1993 | Onzuka et al. .......... 219/69.12 |
| 5,319,175 | A | * | 6/1994 | Truty ....................... 219/69.12 |
| 5,384,444 | A | * | 1/1995 | Truty et al. .............. 219/69.12 |
| 5,430,268 | A | * | 7/1995 | Truty et al. .............. 219/69.12 |

FOREIGN PATENT DOCUMENTS

| EP | 0 371 302 | 6/1990 |
| EP | 0 393 193 | 10/1990 |
| JP | 59-134622 | 8/1984 |
| JP | 63-062618 | 3/1988 |
| JP | 63-251126 | 10/1988 |
| JP | 3-161217 A | * | 7/1991 | .............. 219/69.12 |
| JP | 04-315520 | 11/1992 |
| JP | 5-42420 A | * | 2/1993 |
| JP | 07-299663 | 11/1995 |
| JP | 7-299663 A | * | 11/1995 |
| JP | 2521251 | 10/1996 |
| JP | 10-315053 | 12/1998 |
| JP | 2001-38532 A | * | 2/2001 |

OTHER PUBLICATIONS

European Search Report dated Dec. 20, 2005 for Application No. EP 05 25 6051.

* cited by examiner

*Primary Examiner*—Geoffrey S. Evans
(74) *Attorney, Agent, or Firm*—Staas & Halsey LLP

(57) ABSTRACT

A wire-cut electric discharge machine which improves contact between a wire electrode and a conducting member without deforming the wire electrode to suppress production of minute electric discharges and reduce unnecessary loads on the wire electrode and the wire-cut electric discharge machine, and which makes it easy to make space on a wire traveling path to carry out automatic wire connection easily. In a wire-cut electric discharge machine having a conducting member for supplying an wire electrode with electric power for electric discharge machining, and making the wire electrode travel along a traveling path, sliding on the conducting member, a movable member capable of being moved nearer to and away from the conducting member is provided in a position opposite to the conducting member relative to the traveling path. By this arrangement, the contact between the wire electrode and the conducting member can be always kept without deforming the wire electrode.

14 Claims, 11 Drawing Sheets

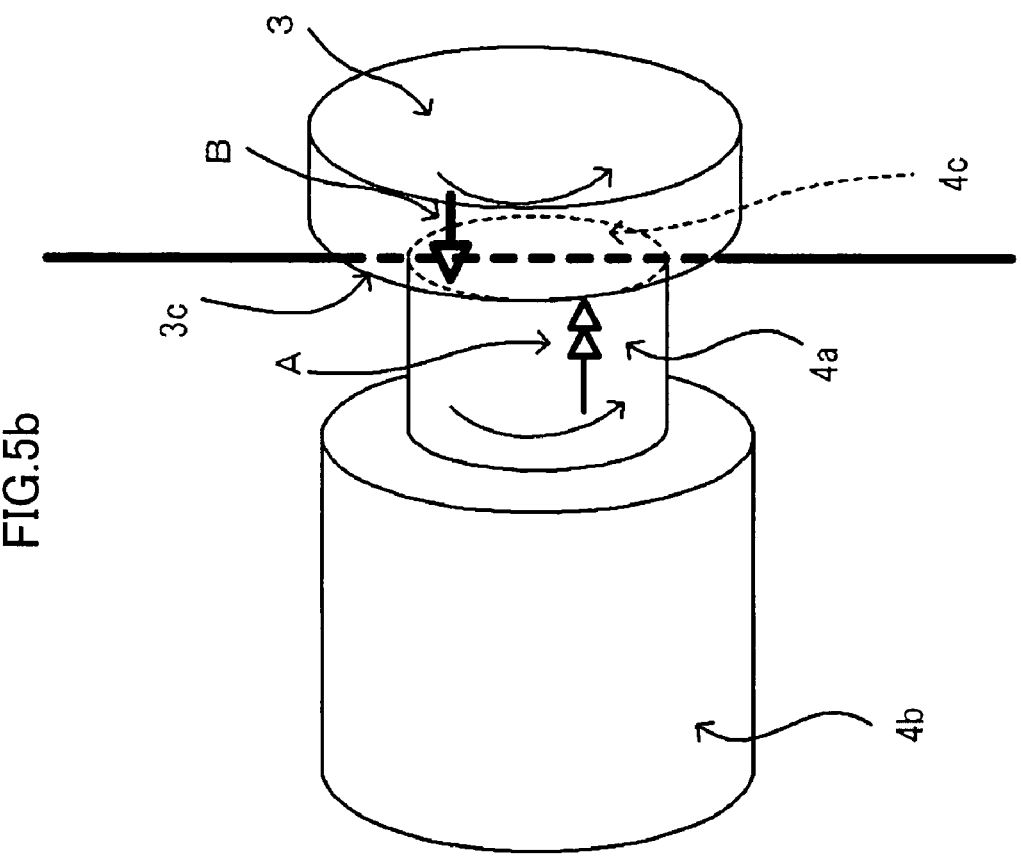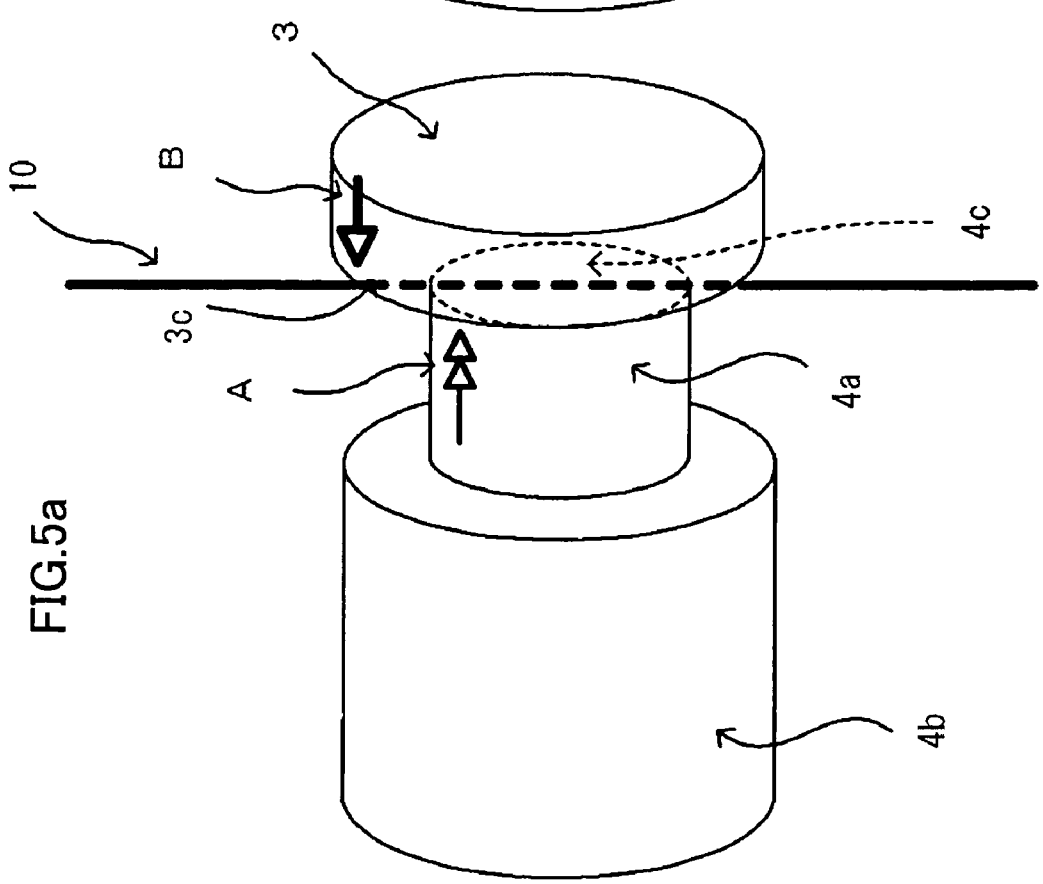

WIRE-CUT ELECTRIC DISCHARGE MACHINE

BACKGROUND OF THE INVENTION

1. Field of the Invention

The present invention relates to a wire-cut electric discharge machine which works on a workpiece using the energy of electric discharges produced between a wire electrode and the workpiece, and in particular, a mechanical part which supplies electric power to the wire electrode.

2. Description of Related Art

In the wire-cut electric discharge machine, as a way to supply electrical energy required for electric discharge machining to the wire electrode through a conducting member, it is known to bring the wire electrode into contact with the conducting member and make the wire electrode travel sliding on the conducting member.

In the supply of electric power performed in the manner that the wire electrode travels sliding on the conducting member, the wire electrode gets in and out of contact with the conducting member as it oscillates. When the wire electrode gets out of contact with the conducting member, minute electric discharges are produced between the wire electrode and the conducting member. The minute electric discharges wear the conducting member. This is more prominent when the speed of machining is higher.

FIG. 13 is a schematic diagram for explaining the relation between the wire electrode 100 and the conducting member 101. FIG. 13a shows the normal machining state in which the wire electrode 100 is in contact with the conducting member 101. In this state, no minute electric discharges are produced between the wire electrode 100 and the conducting member 101. FIG. 13b shows the state in which the wire electrode 110 is not in contact with the conducting member 101. In this state, minute electric discharges can be produced between the wire electrode 100 and the conducting member 101.

Proposals have been made to improve the contact between the wire electrode and the conducting member. For example, JP59-134622A discloses a structure in which oscillation of a wire electrode is suppressed and the life of a conducting member is made longer by pressing a pair of conducting members, which are arc-shaped plates and attached to the inner circumferential surface of a working-fluid spraying nozzle, elastically against a wire electrode from either side. JP63-251126A and JP2521251U disclose a structure in which a conducting member and a wire electrode are moved.

The structure in which the wire electrode is elastically held by the conducting members from either side as in JP59-134622A has the following problems: First, since the conducting members pressed are located in the traveling path of the wire electrode, it is difficult to carry out automatic connection of the wire electrode with certainty. Further, in the structure in which the conducting members are pressed against the wire electrode by means of elastic devices such as springs, the contact pressure between the wire electrode and the conducting member cannot be changed. If the contact pressure becomes lower, the wire electrode can break and the conducting member can wear with higher rate.

The structure in which the conducting member and the wire electrode are moved as in JP63-251126A and JP2521251U has the following problems: The wire electrode is kept in contact with the conducting member due to a tensile force exerted in it. Hence, if the wire electrode oscillates with such a magnitude that the tensile force cannot keep the contact, the wire electrode gets out of contact with the conducting member and a space is produced between the wire electrode and the conducting member, which can cause minute electric discharges to be produced. Further, the wire electrode is always subjected to a load which tends to bend the wire electrode. Hence, the wire electrode can undergo plastic deformation while the traveling is stopped. Such deformation of the wire electrode produces a space between the wire electrode and the conducting member when the traveling is resumed, which can cause minute electric discharges to be produced.

FIG. 14 is a diagram for explaining why minute electric discharges are produced when the wire electrode is deformed. FIG. 14a shows how a conducting member 101 is pressed against a wire electrode 100 by a pressure exerted by a pressure device 102 so that the wire electrode 100 is kept in contact with the conducting member due to the tensile force exerted in it. At this time, the wire electrode 100 is bent by the conducting member 101 pressing it. FIG. 14b shows how minute electric discharges are produced in a space between the wire electrode 100 and the conducting member 101 which is produced due to the oscillation or deformation of the wire electrode 100.

As stated above, the structures proposed have problems such that the deformation of the wire electrode easily causes minute electric discharges to be produced, and that automatic wire connection cannot be carried out easily.

Under some conditions, for example, when the wire electrode has a diameter within a certain range, an external force is not required for the contact between the wire electrode and the conducting member. However, in the structures proposed, an external force is always applied to the wire electrode. Hence, the structures proposed have a problem that various parts of the wire-cut electric discharge machine are subjected to loads.

SUMMARY OF THE INVENTION

The present invention improves contact between a wire electrode and a conducting member without deforming the wire electrode and thereby suppresses production of minute electric discharges. Further, the present invention reduces unnecessary loads on the wire electrode and the wire-cut electric discharge machine, and makes the conducting member automatically retract from a wire traveling path to carry out an automatic wire connection easily.

A wire-cut electric discharge machine of the present invention performs electric discharge machining using a wire electrode which extends between an upper head and a lower head and travels in an extending direction thereof. The wire-cut electric discharge machine comprises: a conducting member for supplying the wire electrode with electric power for the electric discharge machining in sliding contact with the wire electrode, and a movable member arranged in at least one of the upper head and the lower head to confront said conducting member with a path of traveling of the wire electrode in between, and movable close to and apart from said conducting member.

With this arrangement, the contact between the wire electrode and the conducting member can be always kept without deforming the wire electrode. Further, for example, when the contact between the wire electrode and the conducting member is good, the movable member is kept away from the contact to reduce unnecessary loads on the wire-cut electric discharge machine. Further, in carrying out an automatic wire connection, the conducting member can be automatically retracted from the wire traveling path easily.

The movable member is moved close to said conducting member to press the wire electrode against said conducting member so that the wire electrode travels in sliding contact with said conducting member. The movable member is brought into contact with the wire electrode such that the movable member and the conducting member hold the wire electrode between them. In this state, the wire electrode can travel sliding on the movable member and the conducting member, keeping the contact between the wire electrode and the conducting member.

Since the wire electrode is held between the movable member and the conducting member, the wire electrode does not get off the conducting member even when the wire electrode oscillates. Thus, the production of minute electric discharges caused by the wire electrode getting off the conducting member can be reduced.

The conducting member and the movable member may hold the wire electrode in between such that the wire electrode extends along a substantially straight line. With this arrangement, curvature of the wire electrode is reduced, so that loads on the wire electrode and the wire-cut electric discharge machine are reduced. The conducting member is fixed in a position in which the end of the conducting member facing the wire electrode contacts the wire traveling path. The movable member is arranged such that the end of the movable member facing the wire electrode comes into contact with the wire electrode on one side, presses the wire electrode toward the conducting member and thereby brings the wire electrode into contact with the end of the conducting member on the other side.

Since the conducting member is fixed and the wire electrode is set in a position determined by pressing the wire electrode against this fixed conducting member on one side, the wire electrode is not bent by the movable member's pressing, and kept in contact with the conducting member always in the same position. Hence, the degree to which the wire electrode is bent is much smaller compared with the conventional structure in which the wire electrode is kept in contact with the conducting member relying on the tensile force exerted in it.

The movable member is moved apart from said conducting member in performing an automatic connection of the wire electrode. This arrangement secure space for carrying out automatic wire connection on the wire traveling path.

The movable member may be moved and held apart from said conducting member when a predetermined condition is fulfilled, to reduce loads on the wire electrode and the wire-cut electric discharge machine.

The predetermined condition may relate to one of a diameter of the wire electrode, material of the wire electrode and a machining parameter.

When the diameter of the wire electrode is sufficiently great so that the wire electrode has contact with the conducting member on one side when arranged on the traveling path, the wire electrode does not need to be pressed by the movable member. Hence, the movable member is retracted and not brought into contact with the wire electrode.

The diameter of the wire electrode can be obtained from existing data or by position detecting means. Thus, the wire-cut electric discharge machine may further comprise position detecting means for detecting a position of said movable member, and the position detecting means detects a position of said movable member pressing the wire electrode against said conducting member, to determine the diameter of the wire electrode.

The movable member may be selectively moved close to and apart from said conducting member in accordance with the determined diameter of the wire electrode.

A surface of the movable member to be in contact with the wire electrode may have a circular shape. Specifically, the movable member may comprise a cylindrical body arranged movable along an axis thereof and rotatable about the axis. With this arrangement, the part of the movable member which has sliding contact with the wire electrode is not fixed but can be changed by rotating the movable member about the axis, which can prevent the surface of the movable member which has contact with the wire electrode from wearing non-uniformly. If the contact surface of the movable member is not rotated, a groove can be formed in the contact surface of the movable member by the wire electrode, which increases the friction. This can be prevented by rotating the movable member about the axis.

The movable member may rotate about the axis with motion along the axis. The rotation may be carried out at appropriate timing, for example, at the time of the automatic wire connection. It is to be noted that satisfactory effects can be obtained when the rotation of the movable member is carried out over such an angle that can change the part having sliding contact with the wire electrode.

The movable member may be made of insulating material. Insulating material having a low coefficient of friction may be selected so that the wire electrode can travel smoothly sliding on the movable member.

As a mechanism to move the movable member, an appropriate actuator using fluid pressure can be adopted.

The present invention can achieve good contact between the wire electrode and the conducting member without deforming the wire electrode and thereby suppress production of minute electric discharges and reduce an unnecessary load on the wire electrode and the wire-cut electric discharge machine. Further, the conducting member is automatically retracted from the wire traveling path to carry out an automatic wire connection easily.

Furthermore, the friction between movable member and the wire electrode is made constant, and the movable member is prevented from nonuniform wearing.

BRIEF DESCRIPTION OF THE DRAWINGS

FIG. 5 is a diagram for explaining an example of arrangement of a movable member.

DETAILED DESCRIPTION

Figure 1:
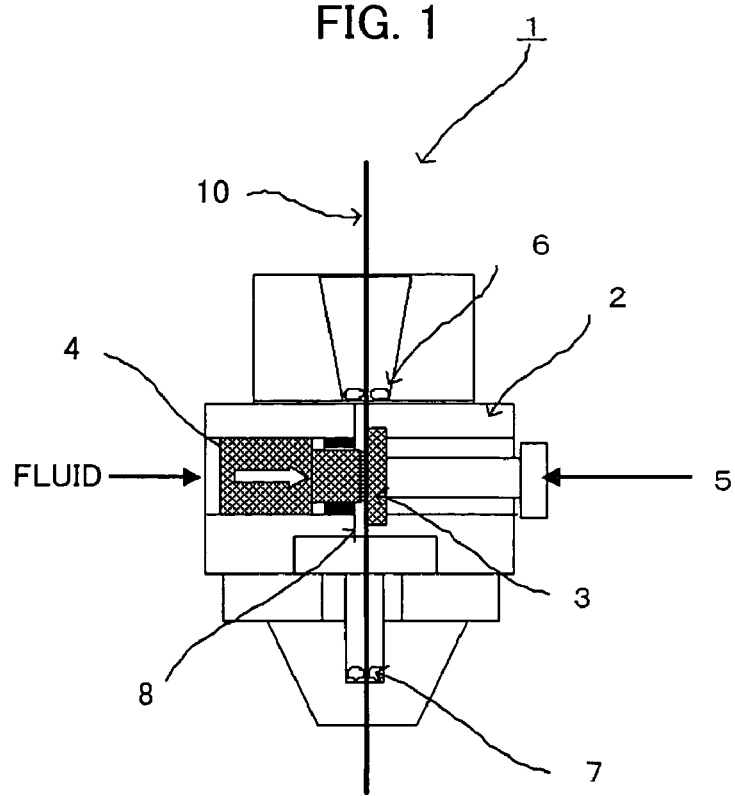
FIG. 1 is a cross-sectional view showing relevant parts of a wire-cut electric discharge machine according to this invention.
Figure 2:
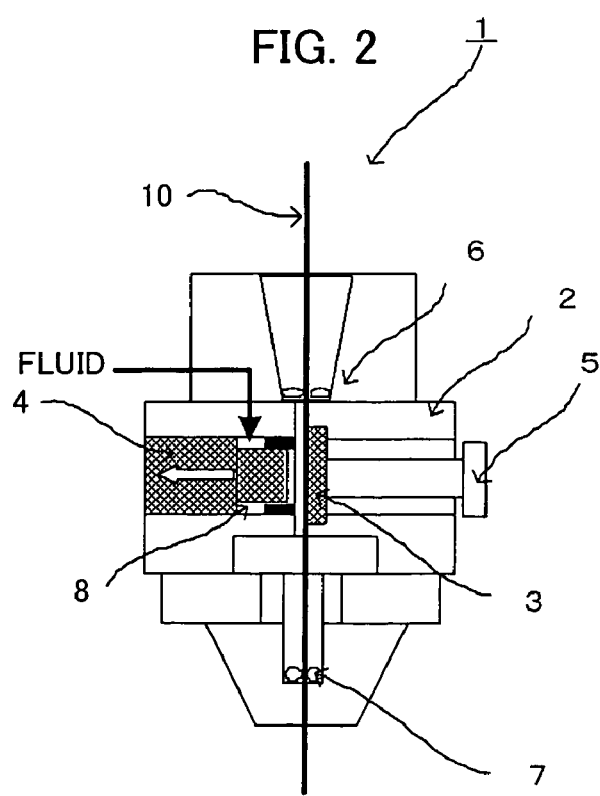
FIG. 2 is a cross-sectional view showing relevant parts of a wire-cut electric discharge machine according to this invention.

FIGS. 1 and 2 are cross-sectional views showing relevant parts of a wire-cut electric discharge machine according to this invention. FIG. 1 shows the state in which a movable member is pressing a wire electrode against a conducting member, and FIG. 2 shows the state in which a movable member has been retracted. It is to be noted that FIGS. 1 and 2 show only a head of a wire-cut electric discharge machine and its vicinity. Further, it is to be noted that the description of structural features which the wire-cut electric discharge machine normally has will be omitted.

In FIG. 1, a wire-cut discharge machine 1 has a head 2 having a vertically extending through-hole 8 through which a wire electrode 10 can travel, and a conducting member 3 which supplies electric power to the wire electrode 10 traveling through the through-hole 8. Over and under the head 2 are provided guides 6, 7 (sub-guide 6, dice guide 7), respectively, to guide the wire electrode 10 in traveling. While traveling along a traveling path which extends through the guides 6, 7 and through-hole 8, the wire electrode 10 receives, from a power source (not shown), supplies of energy required for electric discharges for working on a workpiece (not shown), by contacting the conducting member 3 within the through-hole 8.

On one side of the conducting member 3 is provided a conducting-member pressing screw 5. The position of the conducting member can be set by moving the conducting-member pressing screw 5 relative to the head 2. The position of the front of the conducting member 3 determines the position of the wire electrode 10 within the head 2.

The wire-cut electric discharge machine 1 according to the present invention also has a movable member 4 in a position opposite to the conducting member 3 relative to the traveling path. The movable member 4 is movable relative to the head 2 so that it can be moved nearer to and away from the conducting member 3.

When the wire electrode 10 is arranged on the traveling path, when the movable member 4 is moved nearer to the conducting member 3, the front of the movable member 4 comes into contact with the wire electrode 10 on one side, so that the wire electrode 10 is sandwiched between the movable member 4 and conducting member 3 facing each other. The position of the front of the conducting member 3 determines the position of the wire electrode 10 within the through-hole 8 in the head 2. When the conducting member 3 is set in a position in which the front of the conducting member 3 contacts the traveling path, the wire electrode 10 pressed by the movable member 4 is set almost on the traveling path. It is to be noted that while the conducting member 3 side position of the wire electrode 10 is determined by the position of the front of the conducting member 3, the movable member 4 side position thereof is determined by the diameter of the wire electrode 10.

Hence, when, by the conducting-member pressing screw 5, the conducting member 3 is set in the position in which the front of the conducting member 3 contacts the traveling path, and then the movable member 4 is moved toward the conducting member 3, the movable member 4 contacts the wire electrode 10 on one side and presses the wire electrode 10 toward the conducting member 3. The conducting member 3 pressed moves until it comes into contact with the conducting-member pressing screw 5 on the other side, and is set in that contact position. By this, the wire electrode 10 is set almost on the traveling path. The position of the wire electrode 10 can be fine-adjusted by adjusting the conducting-member pressing screw 5. Thus, the wire electrode 10 can be brought into good contact with the conducting member 3, without being bent. The movable member 4 can be moved, for example, by a fluid pushing the movable member 4. An arrow in FIG. 1 indicates the direction in which a fluid moves the movable member 4.

As the fluid, water, air, oil and others can be used. By providing a pressure control mechanism, the pressing force of the fluid can be controlled. The pushing by the fluid can be switched on and off. By switching the pushing on or off to drive or not drive the movable member 4 depending on the diameter of the wire, the material of the wire or a machining parameter, the wire electrode can be pressed or not pressed against the conducting member, selectively.

The movable member 4 is made to reciprocate by means of a fluid. This can be carried out using a pneumatic or hydraulic actuator.

When the movable member 4 is driven by a fluid such as water, it can be arranged such that the fluid such as water is sprayed onto the wire electrode through a through-hole formed in the movable member. In this case, the fluid such as water also serves to cool the electric discharging part.

The shape of the front of the movable member 4 which presses the wire electrode is not limited to the flat surface but can be a surface other than the flat surface, for example, a curved surface. Also, a roller can be attached to the front.

FIG. 2 shows the state in which the movable member 4 has been retracted. By moving the movable member 4 in the direction of an arrow in FIG. 2, namely moving it away from the conducting member 3, the movable member 4 is retracted from the traveling path. When the wire electrode 10 is arranged on the traveling path, the pressing of the wire electrode 10 against the conducting member 3 is terminated by this retraction of the movable member 4. In connecting the wire electrode 10, since the movable member 4 is retracted from the traveling path within the through-hole 8 in the head 2, the wire electrode 10 can be easily passed through the through-hole 8.

Next, with reference to FIGS. 3 and 4, an example of a motion mechanism for moving the movable member 4 nearer to and away from the conducting member 3 will be described. The example of the motion mechanism described below is one in which the movable member is moved by a fluid pushing it. As the fluid, a liquid such as oil as well as a gas such as air can be used. The motion mechanism is not limited to the example described below but can be arranged other ways. As a drive source, also a rotary drive electric motor or a linear drive electric motor can be used.

Figure 3:
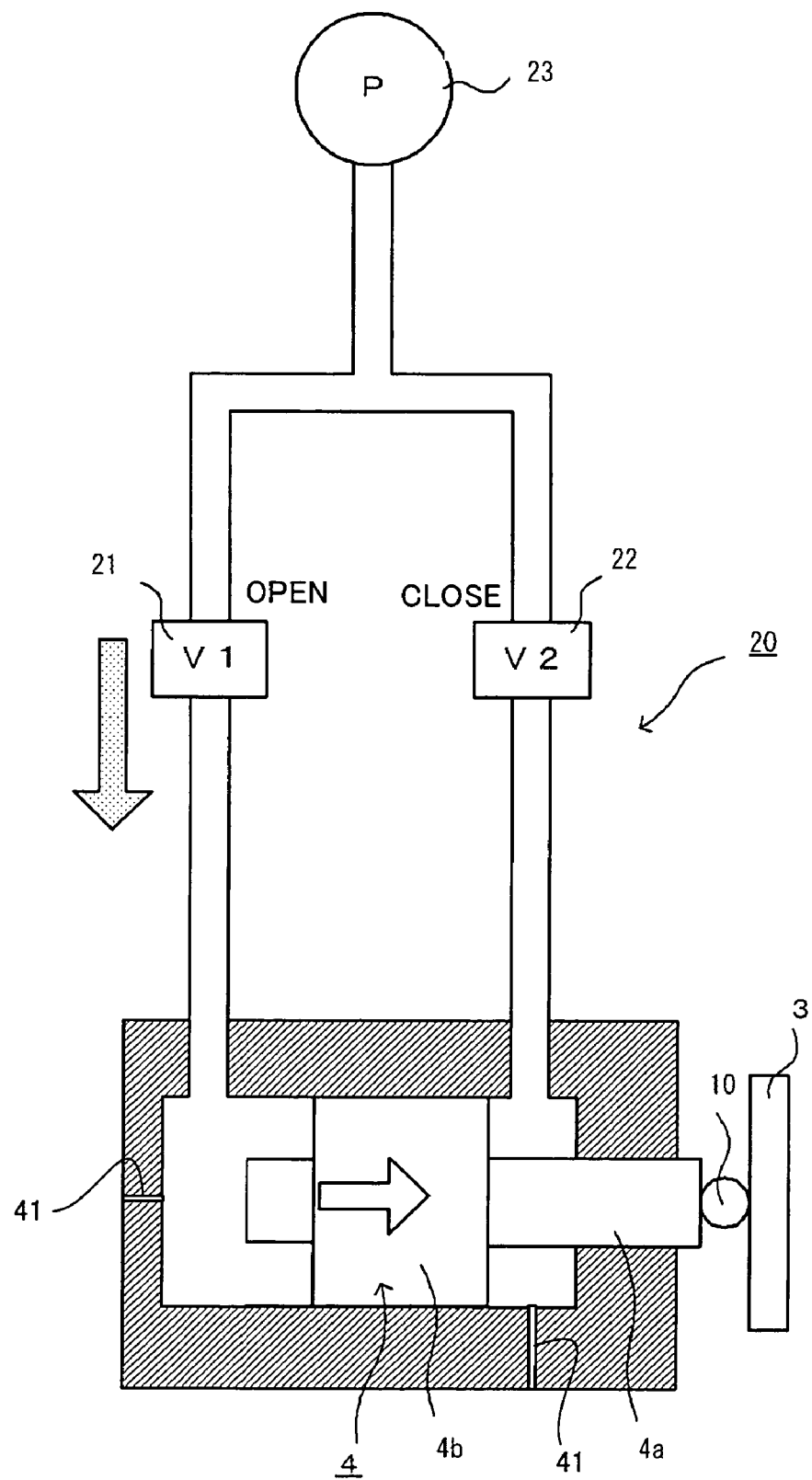
FIG. 3 is a diagram showing the state in which a movable member has been moved nearer to a conducting member.
Figure 4:
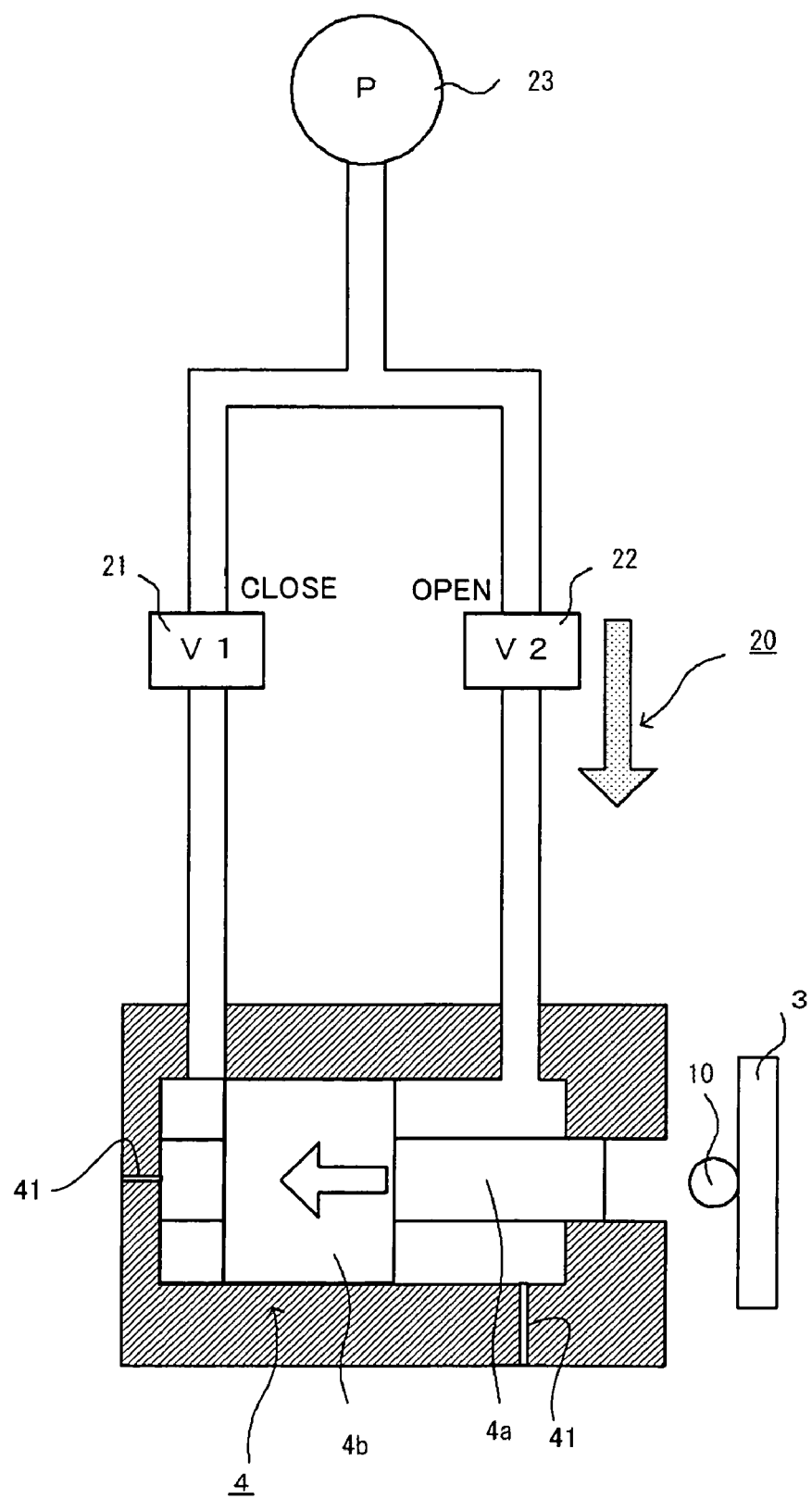
FIG. 4 is a diagram showing the state in which a movable member has been moved away from a conducting member.

FIG. 3 shows the state in which the movable member 4 has been moved nearer to the conducting member 3, and FIG. 4 shows the state in which the movable member 4 has been moved away from the conducting member 3.

In FIGS. 3 and 4, a motion mechanism 20 includes a pump 23 and valves 21 and 22, and selectively supplies a fluid to one of the opposite ends (referred to as first and second ends) of the movable member 4 to move the movable member 4 both ways. FIGS. 3 and 4 shows an example in which the movable member 4 comprises a first movable piece 4a and a second movable piece 4b, where the first movable piece 4a is fixed to the front end (second end) of the second movable piece 4b.

FIG. 3 shows the state in which the valve 21 is opened and the valve 22 is closed. In this state, the fluid pressurized by the pump 23 is supplied to the first end of the movable member 4 through the valve 21 to move the movable member 4 toward the conducting member 3. An arrow in FIG. 3 indicates the direction in which the movable member 4 is moved.

When the valve 21 is opened so that the fluid pushes the second movable piece 4b at the first end, the first movable piece 4a fixed to the second end of the second movable piece 4b moves along with the second movable piece 4b, so that the front of the first movable piece 4a comes nearer to the conducting member 3. When a wire electrode 10 is arranged between the movable member and the conducting member 3, the front of the first movable piece 4a contacts the wire electrode 10 and presses the wire electrode 10 against the conducting member 3 to leave no space between the wire electrode 10 and the conducting member to prevent minute electric discharges from being produced.

FIG. 4 shows the state in which the valve 21 is closed and the valve 22 is opened. In this state, the fluid pressurized by the pump 23 is supplied to the second end of the movable member 4 through the valve 22 to move the movable member 4 away from the conducting member 3. An arrow in FIG. 4 indicates the direction in which the movable member 4 is moved.

When the valve 22 is opened so that the fluid pushes the second movable piece 4b at the second end, the first movable piece 4a fixed to the second end of the second movable piece 4b moves along with the second movable piece 4b in the direction opposite to the direction in FIG. 3, so that the front of the first movable piece 4 recedes from the conducting member 3. Thus, by moving the movable piece 4a away from the conducting member 3, the movable member 4 is retracted from the traveling path, so that the automatic connection of the wire electrode 10 can be carried out easily. In FIGS. 3 and 4, reference numerals 41 denote through holes for discharging the fluid when the movable member 4 is moved.

In automatic wire connection, the fluid is introduced into the space to keep the movable member away from the wire electrode so that the automatic wire connection can be carried out.

The movable member 4 can be arranged such that at least the front of the movable member 4 which has contact with the wire electrode 10 is a circular shape. This arrangement can make the length of the sliding contact between the movable member 4 and the wire electrode 10 always the same and thereby make the sliding friction acting between them uniform. The movable member 4 can be a cylindrical body having an axis extending along the direction of the movement of the movable member, and rotatable about the axis. In this case, the part of the movable member 4 which has sliding contact with the wire electrode is not fixed but can be changed by rotating the movable member 4 about the axis. This can prevent the surface of the movable member 4 which has contact with the wire electrode from wearing non-uniformly.

FIGS. 5a and 5b show an example of such movable member, in which the front surface 4c of the first movable piece 4a of the movable member 4 is also a circular shape. When the movable member 4 is rotated about the axis, the part of the front surface 4c which has contact with the wire electrode 10 changes according to the angle of rotation. Since the front surface 4c is a circular shape, the length of the sliding contact is always the same even when the angle of rotation changes.

Since the part of the front surface 4c which has contact with the wire electrode 10 changes with rotation, non-uniform wear of the contact surface can be prevented. FIGS. 5a and 5b shows the first movable piece 4a of the movable member 4 at different angles of rotation, in which, for example, the arrow A indicates the same particular point on the first movable piece 4a. As seen from FIGS. 5a and 5b, when the first movable piece 4a is rotated, the part of the first movable piece 4a which has contact with the wire electrode 10 changes.

Figure 6A:
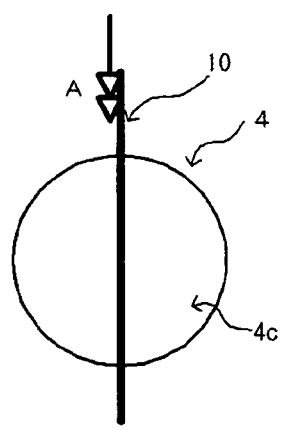
FIGS. 6a to 6f are diagrams for explaining how the positional relation between an end face of a movable member and a wire electrode and the positional relation between an end face of a conducting member and a wire electrode change.
Figure 6B:
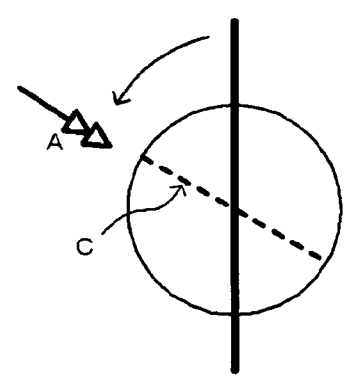
Figure 6C:
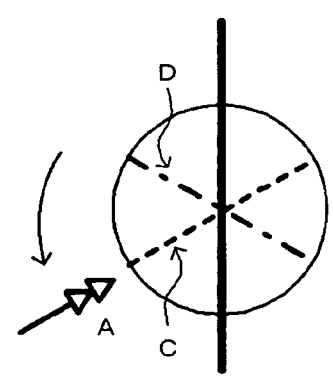

FIGS. 6a to 6c shows how the positional relation between the front surface 4c of the movable member 4 and the wire electrode 10 changes. When the first movable piece 4a is rotated, the part which had contact with the wire electrode 10 in the angular position shown in FIG. 6a takes the position indicated by the dashed line C in FIG. 6b. When the first movable piece 4a is further rotated to take the angular position shown in FIG. 6c, the part indicated by the dashed line C takes a further advanced position, and the part which had contact with the wire electrode 10 in the angular position shown in FIG. 6b takes the position indicated by the alternate long and short dash line D.

Like this, when the front surface 4c of the movable member 4 is rotated, the part of the front surface 4c which has contact with the wire electrode 10 changes. If the contact surface of the movable member is not rotated, a groove can be formed in the contact surface of the movable member by the wire electrode, which increases the friction. This can be prevented by rotating the movable member about the axis.

It can be arranged such that the rotation of the movable member about the axis takes place along with the movement of the movable member along the axis. This can be achieved, for example, by forming a helical groove in the circumferential surface of the cylindrical second movable piece 4b such that the helical groove can have sliding contact with the inner circumferential surface of a part receiving the cylindrical second movable piece 4b, so that the cylindrical second movable piece 4b is rotated as the movable member is moved along the axis.

Further, by providing a unidirectional clutch mechanism between the first movable piece 4a and the second movable piece 4b, it can be arranged such that the rotational position of the second movable piece 4b has no connection with the rotational position of the first movable piece 4a so that the rotational position of the front surface 4c of the first movable piece 4a does not depend on the position of the movable member 4 so that the front surface 4c has contact with the wire electrode 10 in various parts.

The above-described arrangements are intended to make every part of the front surface 4c of the movable member 4 have uniformly contact with the wire electrode 10. The conducting member 3 can be arranged likewise.

Specifically, as shown in FIGS. 5a an 5b, the conducting member 3 can be arranged such that at least the front surface 3c of the conducting member 3 which has contact with the wire electrode 10 is a circular shape and that the conducting member 3 is rotatable about an axis aligned with the axis of the movable member 4. In FIGS. 5*a* an 5*b*, the arrow B indicates a particular point on the conducting member 3 so that how the conducting member is rotated can be seen from FIGS. 5*a* and 5*b*.

Figure 6D:
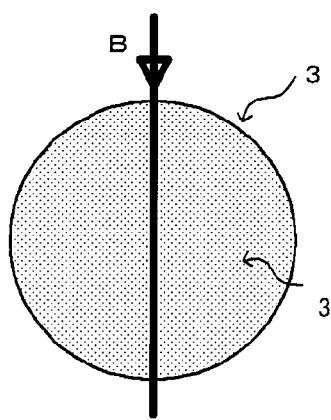
Figure 6E:
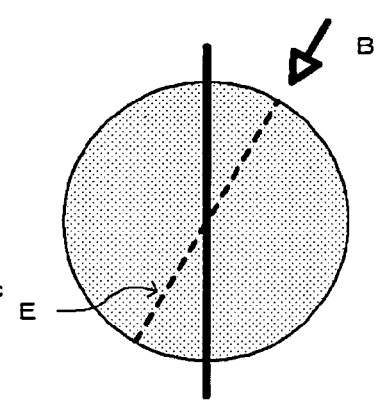
Figure 6F:
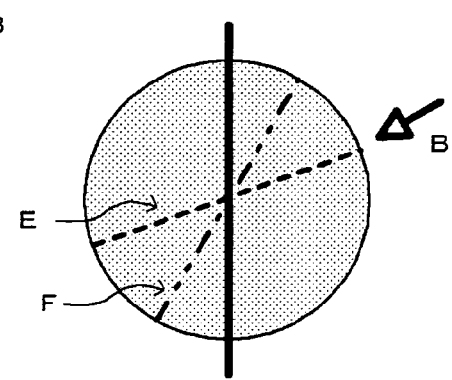

FIGS. 6*d* to 6*f* shows how the positional relation between the front surface 3*c* of the conducting member 3 and the wire electrode 10 changes. When the conducting member 3 is rotated, the part which had contact with the wire electrode 10 in the angular position shown in FIG. 6*d* takes the position indicated by the dashed line E in FIG. 6*e*. When the conducting member 3 is further rotated to take the angular position shown in FIG. 6*f*, the part indicated by the dashed line E takes a further advanced position, and the part which had contact with the wire electrode 10 in the angular position shown in FIG. 6*e* takes the position indicated by the alternate long and short dash line F.

Like this, when the conducting member 3 is rotated, the part of the front surface 3*c* which has contact with the wire electrode 10 changes. If the conducting member is not rotated, a groove can be formed in the contact surface of the conducting member by the wire electrode, which increases the friction. This can be prevented by rotating the conducting member about the axis.

The rotation of the movable member or the conducting member may be carried out at any appropriate timing. It can be arranged such that the rotation is automatically carried out at the time the wire electrode is connected. Satisfactory effects can be obtained when the rotation is carried out over such an angle that can change the part having sliding contact with the wire electrode.

The wire-cut electric discharge machine 1 according to the present invention can be arranged such that the movable member is retracted from the conducting member selectively on the basis of a specific condition set in advance.

The condition set to determine whether to retract the movable member or not can relate to, for example, the diameter of the wire electrode, the material of the wire, or the machining parameter.

For example, when the diameter of the wire electrode is sufficiently great so that the wire electrode has contact with the conducting member on one side when arranged on the traveling path, the wire electrode does not need to be pressed against the conducting member by the movable member. Hence, the wire-cut electric discharge machine 1 according to the present invention retracts the movable member and does not press the movable member 4 toward the conducting member 3.

The diameter of the wire electrode can be obtained from existing data or by a measurement means. The measurement means can be one using a position detection means for detecting the position of the movable member. The position detection means detects the position of the movable member when the movable member is pressing the wire electrode against the conducting member, and on the basis of the position detected, recognizes the diameter of the wire electrode automatically.

The wire-cut electric discharge machine automatically and selectively presses or retracts the movable member, on the basis of the wire diameter obtained from existing wire-diameter data or by the position detection means and a specific value set for the wire diameter.

In addition to when the wire diameter is sufficiently great, also when it is determined, from the material of the wire or the machining parameter, that the risk of minute electric discharges being produced is low, the wire electrode does not need to be pressed by the movable member, so that the movable member is retracted.

Figure 7:
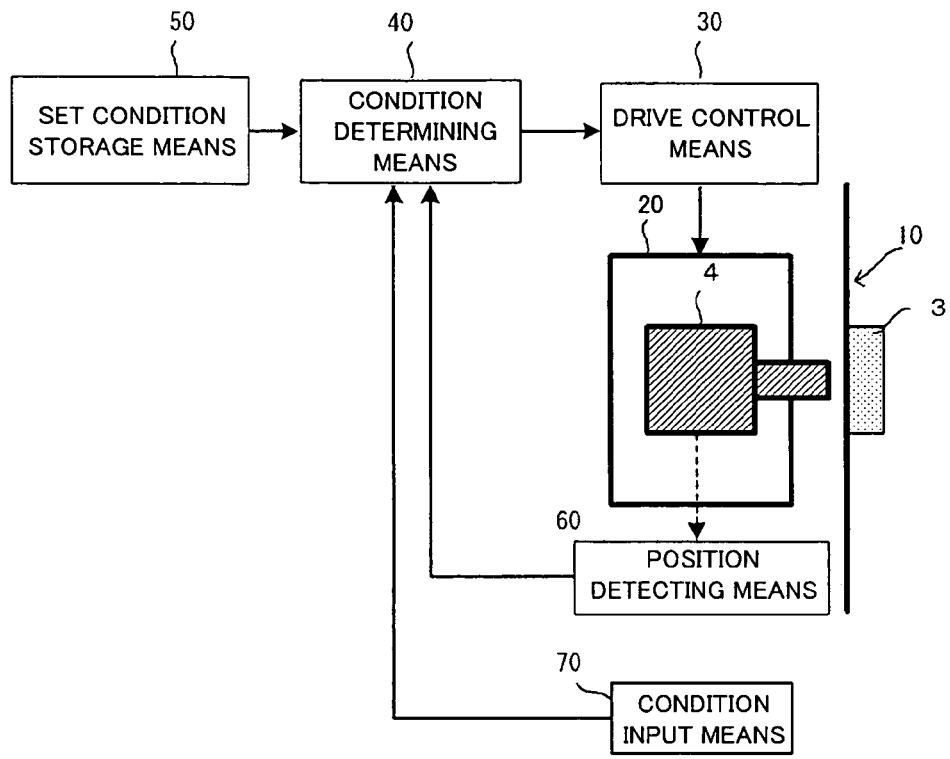
FIG. 7 is a block diagram for explaining a control mechanism for controlling the pressing by a movable member according to this invention.

FIG. 7 is a block diagram for explaining a control mechanism which controls the pressing by the movable member.

In FIG. 7, the motion mechanism 20 moves the movable member 4 nearer to and away from the conducting member 3 as described above. A drive control means 30 controls the movement of the movable member 4. The drive control means 30 can perform control on the basis of the result of determination by a condition determination means 4, and performs drive control on the basis of the result of comparison between a condition set in advance and a condition fed. The set condition can be stored in a set condition storage means 50.

The condition determining means 40 compares the fed condition with the set conditions, and on the basis of the result of this comparison, the drive control means 30 performs drive control on the movable member, determining whether to move the movable member or not and in which direction to move it.

For example, when the driving of the movable member 4 is controlled on the basis of the diameter of the wire electrode 10, the position detecting means 60 detects the position of the movable member 4 and feeds the position data to the condition determining means 40. The condition determining means 40 calculates the diameter of the wire electrode 10 from the position of the movable member 4 fed, and compares the diameter calculated with the diameter set in advance and recorded in the set condition storage means 50. When the calculated diameter is greater than the set diameter, the condition determining means 40 determines that the pressing by the movable member 4 is unnecessary, and instructs the drive control means 30 to retract the movable member 4. When the calculated diameter is smaller than the set diameter, the condition determining means 40 determines that the pressing by the movable member 4 is necessary, and instructs the drive control means 30 to move the movable member 4.

When the driving of the movable member 4 is controlled on the basis of the material of the wire or the machining parameter, the material of the wire electrode or the machining parameter used in machining is entered using a condition input means 70, and the data entered is fed to the condition determining means 40. The condition determining means 40 compares the material or machining parameter entered with the material or machining parameter set in advance in the set condition storage means 50. When the condition determining means 40 determines that the pressing by the movable member 4 is unnecessary, it instructs the drive control means 30 to retract the movable member 4. When the condition determining means 40 determines that the pressing by the movable member 4 is necessary, it instructs the drive control means 30 to move the movable member 4.

With reference to the flow charts in FIGS. 8 and 9, movement control on the movable member will be described.

Figure 8:
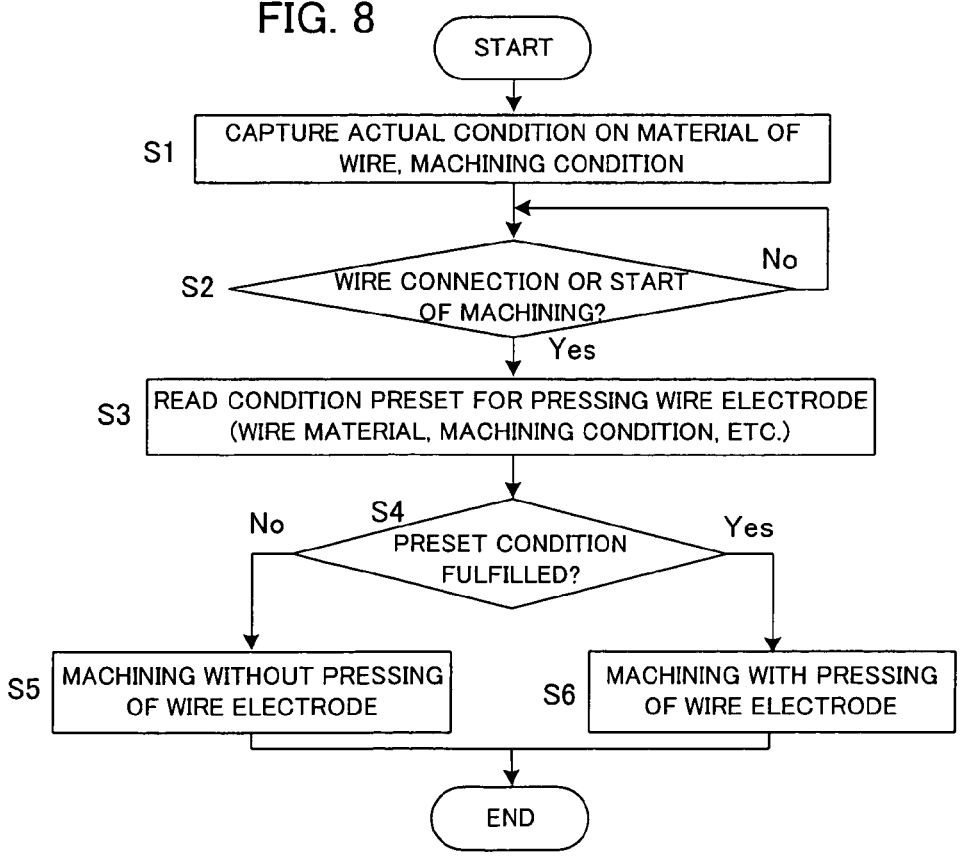
FIG. 8 is a flow chart for explaining an example of control on movement of a movable member on the basis of the material of a wire or a machining parameter.

The flow chart in FIG. 8 relates to an example in which movement control on the movable member is based on the material of the wire or the machining parameter. The condition input means 79 captures an actual condition relating to the pressing of the wire electrode for machining (material of the wire or machining condition) (Step S1). In drive control as in a wire connection or at a start of machining (Step S2), a predetermined condition for pressing the wire electrode set in advance is read from the set condition storage means 50 (Step S3), and it is determined whether or not the actual condition fulfills the set condition (Step S4).

When it is determined that the actual condition does not meet the set condition, machining is performed without pressing the wire electrode against the conducting member (Step S5). When it is determined that the actual condition meets the set condition, the wire electrode is pressed against the conducting member, and then, in that state, machining is performed (Step S6).

Figure 9:
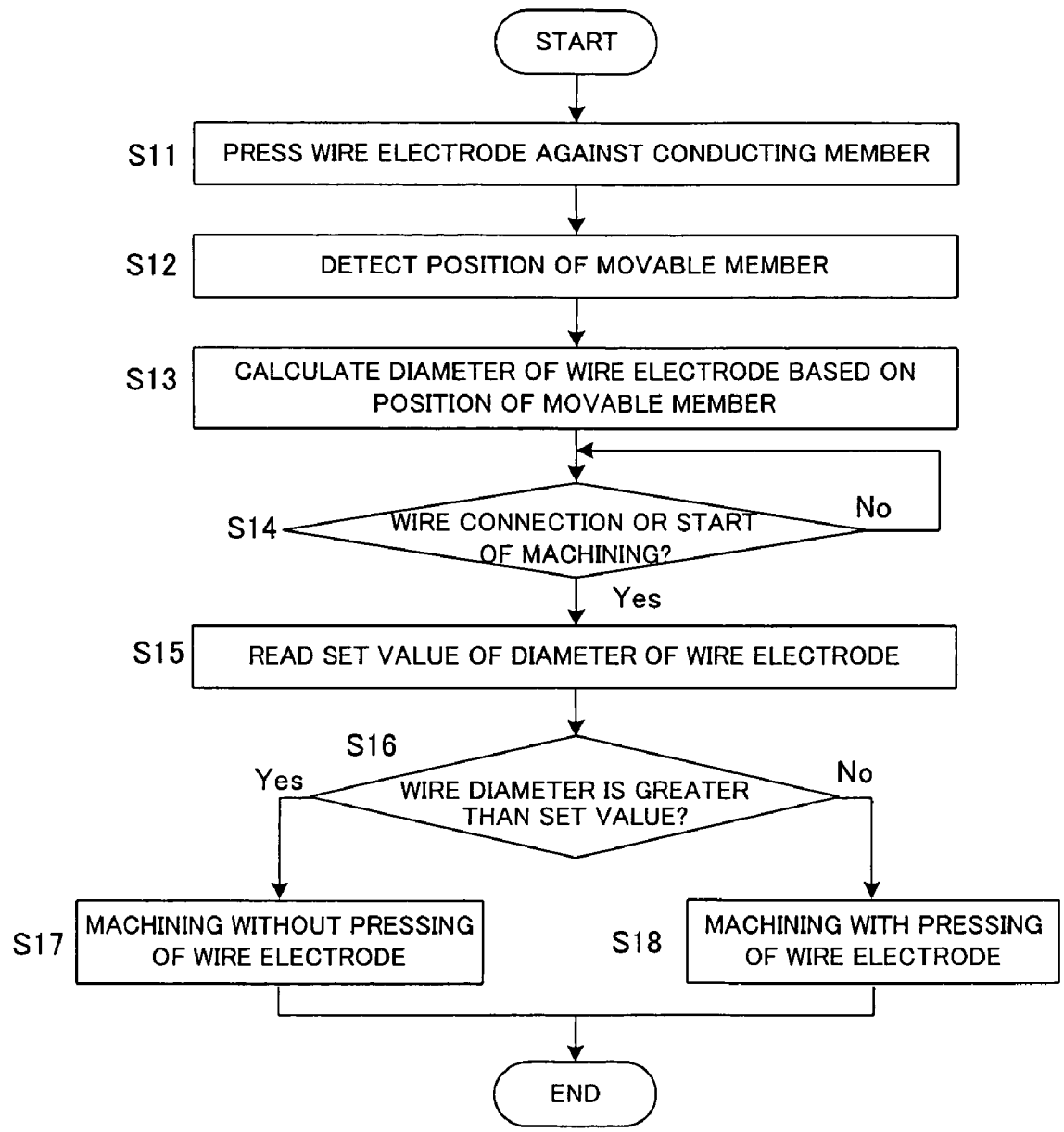
FIG. 9 is a flow chart for explaining an example of control on movement of a movable member on the basis of the diameter of a wire.

The flow chart in FIG. 9 relates to an example in which movement control on the movable member is based on the diameter of the wire.

First, with the wire electrode 10 passed through the head 2, the movable member 4 is moved toward the conducting member 3 under the control of the drive control means 30 to press the wire electrode 10 against the conducting member 3 (Step S11).

The position detecting means 60 detects the position of the movable member 4 (Step S12), and calculates the diameter of the wire electrode 10 based on the position of the movable member 4 detected (Step S13). In drive control at a wire connection or a start of machining (Step S14), a value set in advance for the diameter of the wire electrode is read from the set condition storage means 50 (Step S15), and it is determined whether or not the diameter calculated is greater than the set value is determined (Step S16).

When it is determined that the calculated diameter is greater than the set value, machining is performed without pressing the wire electrode against the conducting member (Step S17). When it is determined that the calculated diameter is smaller than the set value, the wire electrode is pressed against the conducting member, and then, in that state, machining is performed (Step S18).

Figure 10:
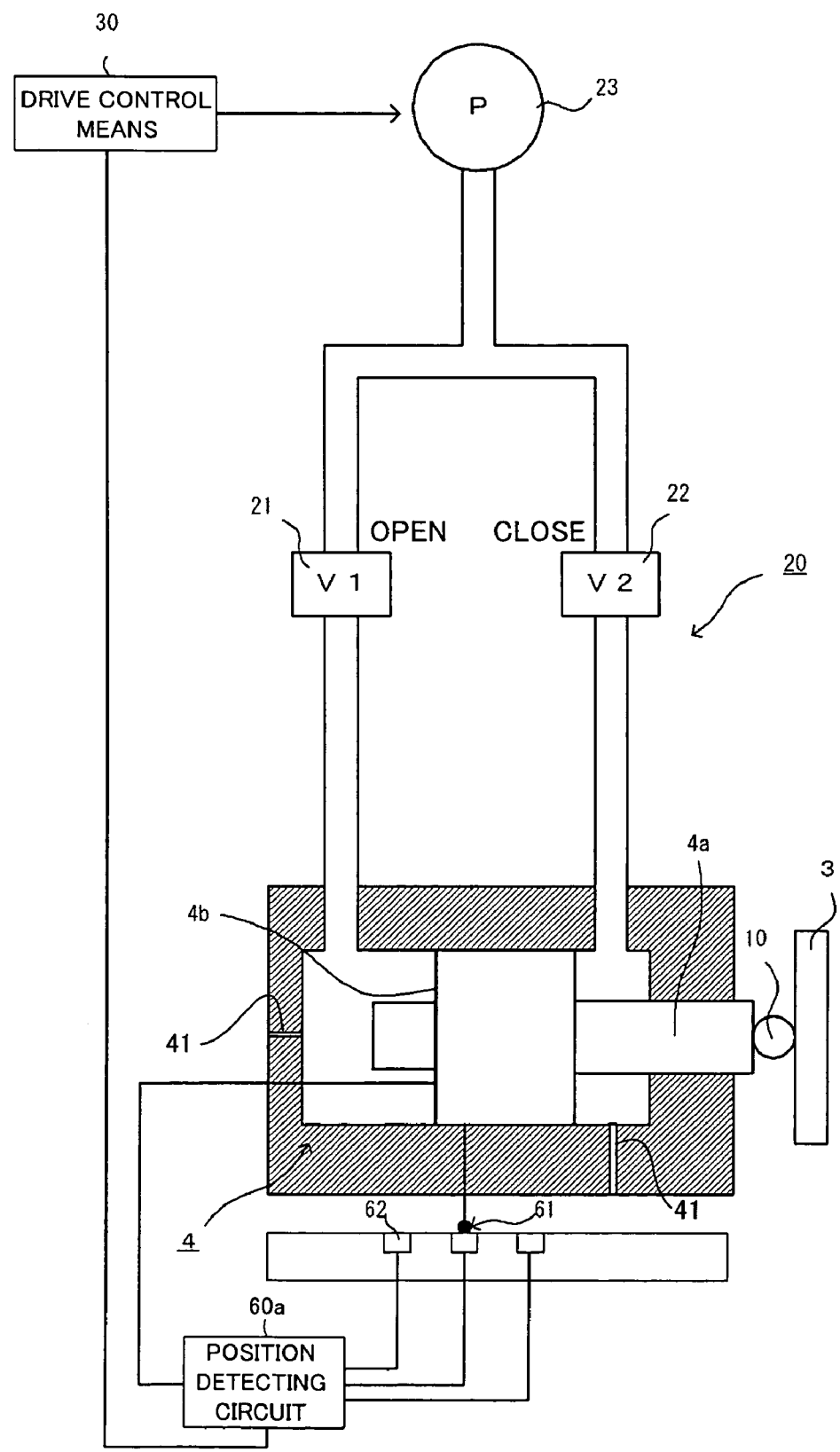
FIG. 10 is a diagram for explaining an example of arrangement of a position detection means.

FIG. 10 is a diagram for explaining an example of arrangement of the position detection means. In FIG. 10, a contact member 61 moving along with the movable member 4 is attached to the movable member 4. Detectors 62 detect this contact member 61, and the position detection means detects the position of the movable member 4 on the basis of a contact member 61 detection signal. The detectors 62 can be arranged at intervals of several ten μm, for example, so that a position detecting circuit 60a can detect the position of the movable member 4 in units of several ten μm.

Next, with reference to FIGS. 11 and 12, how the control on the movable member is performed on the basis of the diameter of the wire electrode will be described.

FIG. 11 shows an example of control when the wire electrode has a small diameter, and FIG. 12 shows an example of control when the wire electrode has a great diameter.

In FIGS. 11 and 12, a mark "x" (denoted by the sign G) and the chain line indicate the position of the traveling path of the wire electrode, and signs P and Q indicate particular points set on the movable member and a fixed part, respectively.

Figure 11A:
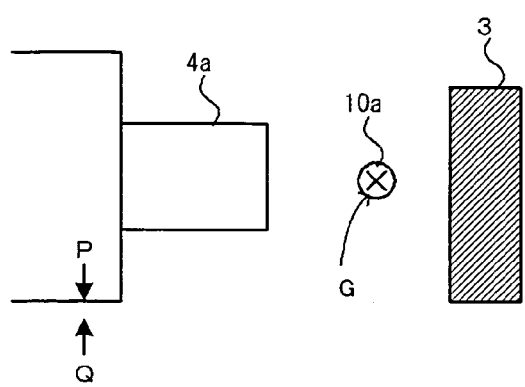
FIGS. 11a to 11f are diagrams for explaining an example of how a movable member is controlled on the basis of the diameter of a wire electrode.
Figure 11B:
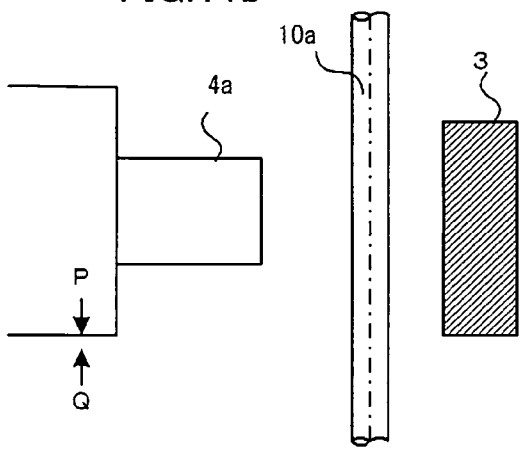

FIGS. 11*a* and 11*b* show the state after the conducting member 3 is set in a predetermined position, the movable member 4 is retracted, and then a wire electrode 10 is set. In this state, if the wire electrode 10 oscillates, a space is produced between the wire electrode 10 and the conducting member 3, which can cause minute electric discharges to be produced. In this state, point P on the movable member has a specific positional relationship with point Q on the fixed part.

Figure 11C:
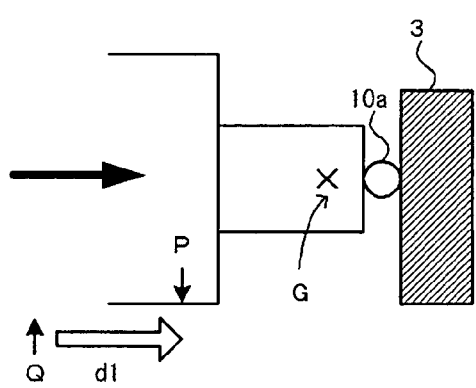
Figure 11D:
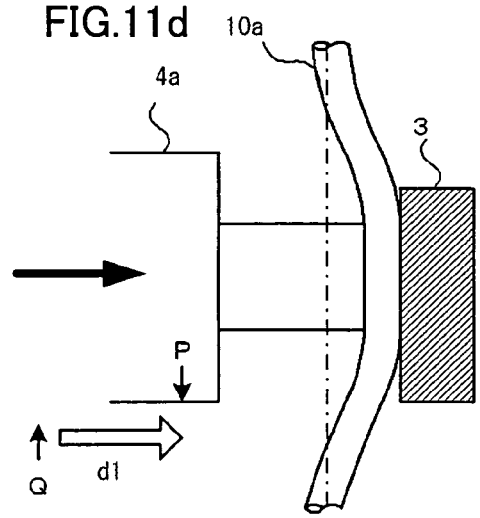

Next, the movable member 4 is moved toward the conducting member 3 to bring the wire electrode 10 into contact with the conducting member 3. FIGS. 11*c* and 11*d* shows the state of contact this time. At this time, point P on the movable member has moved, for example, distance d1 from point Q on the fixed part. The diameter of the wire electrode 10*a* can be calculated from the position of point P on the movable member in this state or the displacement d1.

Figure 11E:
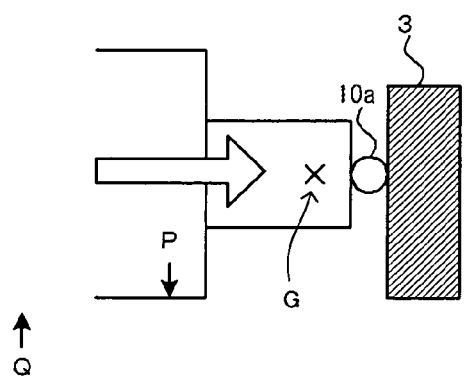
Figure 11F:
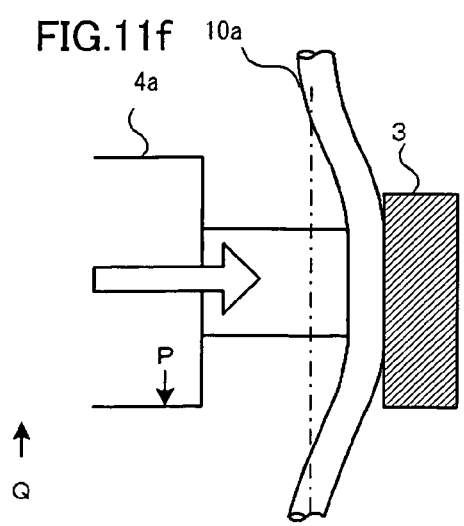

After this, the drive control means drives the movable member 4 on the basis of the diameter of the wire electrode 10 calculated, and performs control so that the movable member 4 is always in the position shown in FIGS. 11*e* and 11*f*. By performing position control so that the movable member 4 is in this position, the wire electrode 10 is always kept in contact with the conducting member 3. It is to be noted that in FIG. 11, by adjusting the position of the conducting member 3 so that the wire electrode 10*a* extends on the traveling path, the curvature of the wire electrode shown in FIGS. 11*e* and 11*f* can be reduced.

Figure 12A:
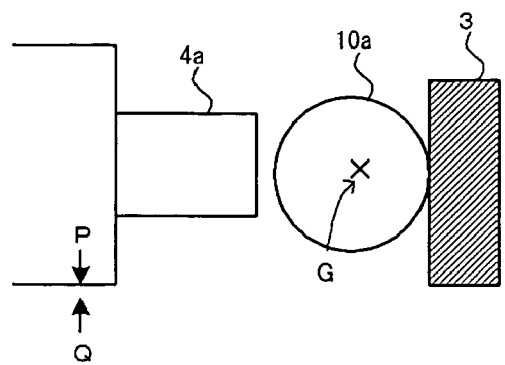
FIGS. 12a to 12f are diagrams for explaining an example of how a movable member is controlled on the basis of the diameter of a wire electrode.
Figure 12B:
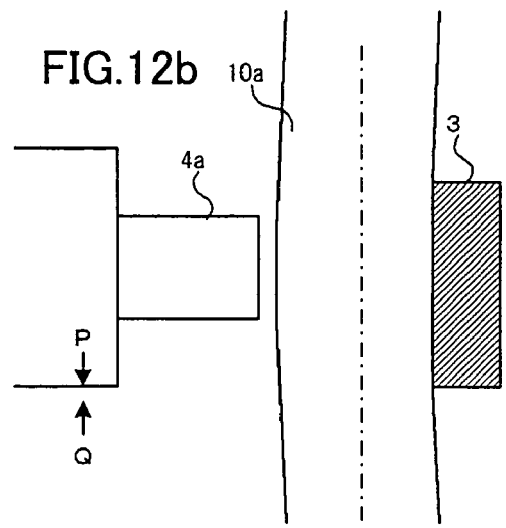

FIGS. 12*a* and 12*b* show the state after the conducting member 3 is set in a predetermined position, the movable member 4 is retracted, and then a wire electrode 10 is set. In this state, since the wire electrode 10*b* has a great diameter, the wire electrode 10 does not oscillate, and therefore there is no concern that a space will be produced between the wire electrode 10 and the conducting member 3 and cause minute electric discharges to be produced.

Figure 12C:
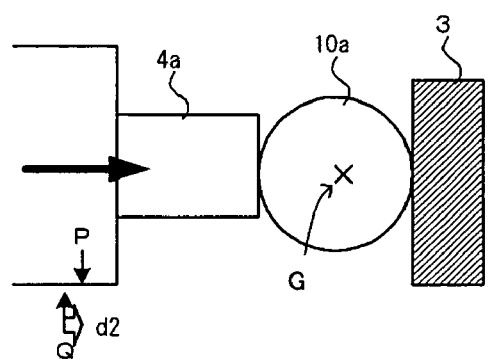
Figure 12D:
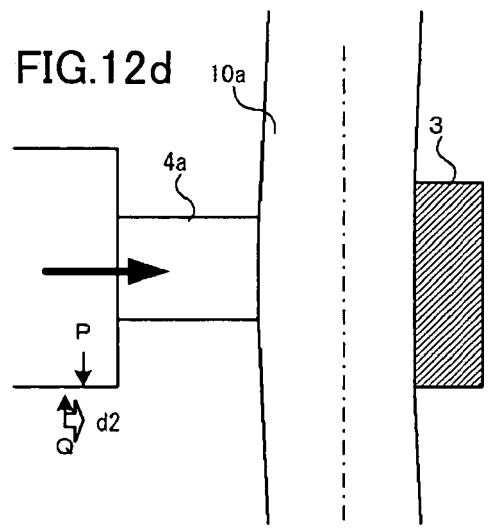
Figure 12E:
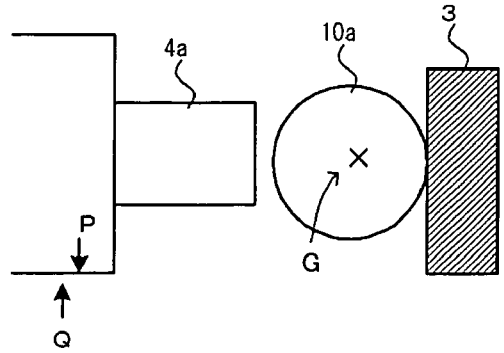
Figure 12F:
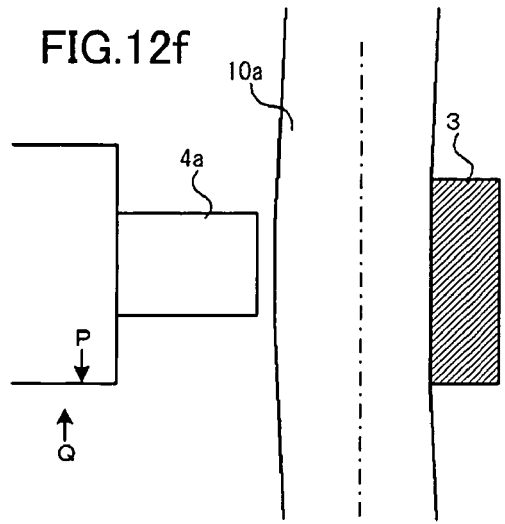
Figure 13A:
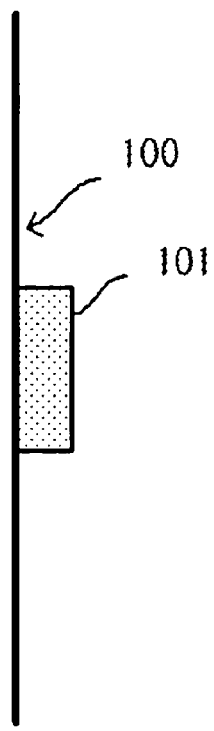
FIGS. 13a and 13b are diagrams for explaining the relation between a wire electrode and a conducting member.
Figure 13B:
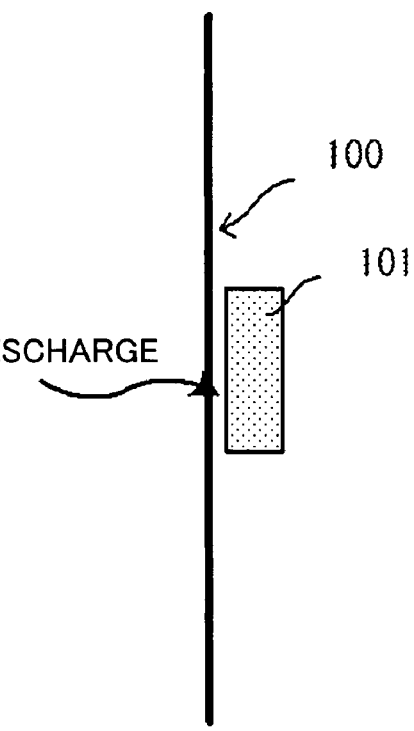
Figure 14A:
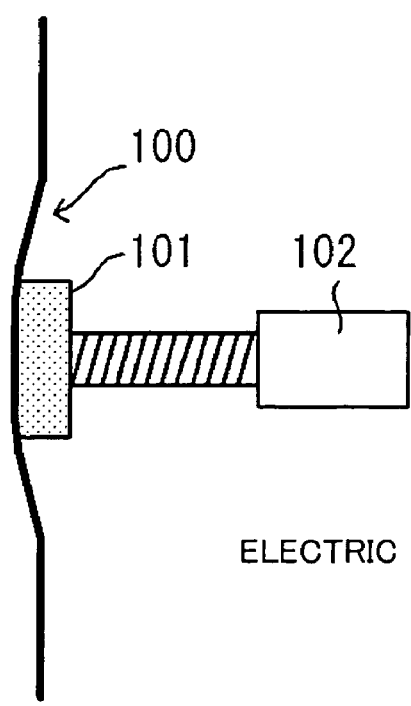
FIGS. 14a and 14b are diagrams for explaining how minute electric discharges are produced when a wire electrode is deformed.
Figure 14B:
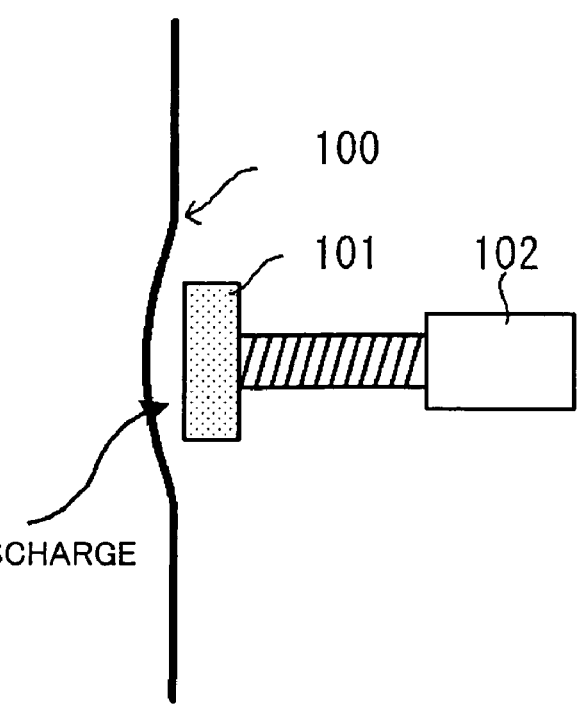

Next, the movable member 4 is moved toward the conducting member 3 to bring the wire electrode 10 into contact with the conducting member 3. FIGS. 12*c* and 12*d* shows the state of contact this time. At this time, point P on the movable member has moved, for example, distance d2 from point Q on the fixed part. The diameter of the wire electrode 10 can be calculated from of the position of point P on the movable member in this state or the displacement d2. On the basis of the calculated diameter, it is determined that it is not necessary to move the movable member 4. After this, the drive control means retracts the movable member 4, and performs control so that the movable member 4 is always in the position shown in FIGS. 12*e* and 12*f*. By performing position control so that the movable member 4 is in this position, the wire electrode 10 is always kept in contact with the conducting member 3.

By retracting the movable member from the conducting member selectively on the basis of a specific condition set in advance, loads on the wire electrode and the wire-cut electric discharge machine can be reduced.

What is claimed is:

1. A wire-cut electric discharge machine for performing electric discharge machining using a wire electrode which extends between an upper head and a lower head and travels in an extending direction thereof, comprising:

a conducting member for supplying the wire electrode with electric power for the electric discharge machining in sliding contact with the wire electrode;

a movable member arranged in at least one of the upper head and the lower head to confront said conducting member with a path of traveling of the wire electrode in between, and movable close to and apart from said conducting member; and position detecting means for detecting a position of said movable member, said position detecting means detecting a position of said movable member pressing the wire electrode against said conducting member, to determine a diameter of the wire electrode.

2. A wire-cut electric discharge machine according to claim 1, wherein said conducting member and said movable member hold the wire electrode in between such that the wire electrode extends along a substantially straight line.

3. A wire-cut electric discharge machine according to claim 1, wherein said movable member is moved close to said conducting member to press the wire electrode against said conducting member so that the wire electrode travels in sliding contact with said conducting member.

4. A wire-cut electric discharge machine according to claim 1, wherein said movable member is moved apart from said conducting member in performing an automatic connection of the wire electrode.

5. A wire-cut electric discharge machine according to claim 4, wherein said movable member is moved and held apart from said conducting member when a predetermined condition is fulfilled.

6. A wire-cut electric discharge machine according to claim 5, wherein the predetermined condition relates to one of a diameter of the wire electrode, material of the wire electrode and a machining parameter.

7. A wire-cut electric discharge machine according to claim 1, wherein said movable member is made of insulating material.

8. A wire-cut electric discharge machine according to claim 1, wherein said movable member is selectively moved close to and apart from said conducting member in accordance with the determined diameter of the wire electrode.

9. A wire-cut electric discharge machine according to claim 1, wherein a surface of said movable member to be in contact with the wire electrode has a circular shape.

10. A wire-cut electric discharge machine according to claim 1, wherein said movable member comprises a cylindrical body arranged movable along an axis thereof and rotatable about the axis.

11. A wire-cut electric discharge machine according to claim 1, wherein said movable member is moved by fluid pressure.

12. A wire-cut electric discharge machine for performing electric discharge machining using a wire electrode which extends between an upper head and a lower head and travels in an extending direction thereof, comprising:
  a conducting member for supplying the wire electrode with electric power for the electric discharge machining in sliding contact with the wire electrode, and
  a movable member arranged in at least one of the upper head and the lower head to confront said conducting member with a path of traveling of the wire electrode in between, and movable close to and apart from said conducting member, said movable member comprising a cylindrical body arranged movable along an axis thereof and rotatable about the axis;
  wherein said cylindrical body rotates about the axis with motion along the axis.

13. A method of performing discharge machining, comprising:
  moving a movable member in confronting relation with a conducting member arranged in an least one of an upper head and a lower head such that a through-hole vertically extending between the upper and lower head and through which a wire electrode extends is between the movable member and the conducting member; and
  supplying electric power for discharge machining to the wire electrode to perform discharge machining,
  wherein the movable member comprises a cylindrical body rotatable about an axis and moving in the direction of the axis when the movable member is moved in confronting relation with the conducting member.

14. A wire-cut electric discharge machine for performing electric discharge and using a wire electrode, comprising:
  a head having an upper portion and a lower portion, and having a through-hole vertically extending between the upper and lower portions of the head through which the wire electrode extends;
  a conducting member supplying the wire electrode with electric power; and
  a movable member arranged in the head opposite the conducting member relative to the through-hole and wire electrode and movable toward the conducting member to press the wire electrode toward the conducting member,
  wherein the movable member comprises a cylindrical body rotatable about an axis and moving in the direction of the axis when the movable member is moved in confronting relation with the conducting member.

* * * * *

UNITED STATES PATENT AND TRADEMARK OFFICE
CERTIFICATE OF CORRECTION

| | | |
|---|---|---|
| PATENT NO. | : 7,217,902 B2 | Page 1 of 1 |
| APPLICATION NO. | : 11/237714 | |
| DATED | : May 15, 2007 | |
| INVENTOR(S) | : Yuki Kita et al. | |

It is certified that error appears in the above-identified patent and that said Letters Patent is hereby corrected as shown below:

Column 8, Line 45-46, change "circumferentical" to --circumferential--.

Column 11, Line 17, change "(Step S1)." to --(Step S11).--.

Column 14, Line 11, after "in" change "an" to --at--.

Signed and Sealed this

Eleventh Day of September, 2007

JON W. DUDAS
*Director of the United States Patent and Trademark Office*